(12) United States Patent
Kluftinger et al.

(10) Patent No.: US 12,099,460 B2
(45) Date of Patent: Sep. 24, 2024

(54) WHEEL INFORMATION TRANSFER APPARATUS, WHEEL INFORMATION TRANSFER METHOD AND VEHICLE HAVING WHEEL INFORMATION TRANSFER APPARATUS

(71) Applicant: Knorr-Bremse Systeme Fuer Nutzfahrzeuge GmbH, Munich (DE)

(72) Inventors: Andre Kluftinger, Kleinheubach (DE); Andreas Windisch, Unterhaching (DE); Klaus Lechner, Bretzfeld (DE); Gerhard Wieder, Besigheim (DE); Karl-Heinz Schmid, Besigheim (DE); Alexander Rammert, Kornwestheim (DE); Felix Thierfelder, Unterschleissheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 107 days.

(21) Appl. No.: 17/782,383

(22) PCT Filed: Nov. 16, 2020

(86) PCT No.: PCT/EP2020/082280
§ 371 (c)(1),
(2) Date: Jun. 3, 2022

(87) PCT Pub. No.: WO2021/110398
PCT Pub. Date: Jun. 10, 2021

(65) Prior Publication Data
US 2023/0026222 A1    Jan. 26, 2023

(30) Foreign Application Priority Data

Dec. 6, 2019  (DE) ..................... 10 2019 133 440.3

(51) Int. Cl.
*G06F 13/42* (2006.01)
*G08C 19/00* (2006.01)

(52) U.S. Cl.
CPC ......... *G06F 13/4282* (2013.01); *G08C 19/00* (2013.01); *G06F 2213/0002* (2013.01)

(58) Field of Classification Search
CPC .................................................. G06F 18/2178
See application file for complete search history.

(56) References Cited

U.S. PATENT DOCUMENTS

2004/0075450 A1 *  4/2004  Buge ...................... G08C 15/00
                                                        324/710
2004/0249544 A1    12/2004  Lohberg
(Continued)

FOREIGN PATENT DOCUMENTS

DE    102010025872 A1    1/2012
DE    102014216295 A1    2/2016
(Continued)

OTHER PUBLICATIONS

International Search Report for PCT/EP2020/082280 Issued Jan. 27, 2021.

*Primary Examiner* — Henry Tsai
*Assistant Examiner* — Juanito C Borromeo
(74) *Attorney, Agent, or Firm* — NORTON ROSE FULBRIGHT US LLP; Gerard A. Messina

(57) ABSTRACT

A wheel information transfer apparatus, including: an information detection apparatus to detect and store wheel-related information; and an information transfer apparatus to transfer the wheel-related information over a transfer medium; in which the information transfer apparatus is configured to transfer at least a first portion of the wheel-related information parallel or quasi-parallel, and in which the information transfer apparatus is configured to transfer the at least first portion of the wheel-related information or a second portion (Continued)

of the wheel-related information serially within the parallel or quasi-parallel data transfer. Also described are a wheel information transfer method and a related vehicle.

15 Claims, 3 Drawing Sheets

(56) References Cited

U.S. PATENT DOCUMENTS

| | | | |
|---|---|---|---|
| 2006/0034301 A1* | 2/2006 | Anderson | H04L 69/22 |
| | | | 370/401 |
| 2008/0271708 A1 | 11/2008 | Rodriguez-Amaya | |
| 2013/0073250 A1 | 3/2013 | Acker | |
| 2013/0101065 A1 | 4/2013 | Heim | |
| 2014/0210641 A1 | 7/2014 | Hammerschmidt | |
| 2016/0231141 A1* | 8/2016 | Endres | G01D 5/24466 |

FOREIGN PATENT DOCUMENTS

| | | |
|---|---|---|
| DE | 102017125562 A1 | 5/2018 |
| WO | 2015039895 A1 | 3/2015 |

* cited by examiner

WHEEL INFORMATION TRANSFER APPARATUS, WHEEL INFORMATION TRANSFER METHOD AND VEHICLE HAVING WHEEL INFORMATION TRANSFER APPARATUS

FIELD OF THE INVENTION

The present invention relates to a wheel information transfer apparatus, a wheel information transfer method, and a vehicle having a wheel information transfer apparatus and relates in particular to such an apparatus and such a method for detecting a wheel rotation speed which transfer additional information.

BACKGROUND INFORMATION

Active wheel rotation speed sensors which detect the rotation speed of a wheel and transmit it by rotation speed pulses over a two-core cable as transfer medium to an evaluation device, for example a control device for an anti-lock braking system, are known from the prior art, in particular in the case of passenger vehicles. In accordance with the AK protocol of the work group of the automotive industry which is known per se, additional information can be transferred. The AK protocol is a current protocol in which the active rotation speed sensor is supplied a voltage. By varying the internal resistance of the sensor and modulation, brought about thereby, of the current, the additional information is transferred. The transferred information is expanded, in addition to the rotation speed, by information such as direction of rotation, air gap reserve and validation of the signal. In this case, owing to demands placed on autonomous driving functions in utility vehicles, such wheel rotation speed sensors known from passenger vehicles are increasingly installed in utility vehicles. In this case, the utility vehicle-typical demands exceed the demands from the passenger vehicle. Thus, for example, the transfer of a temperature signal from the sensor is desired in order to identify an overheated brake. For example, plausibility checks in respect of a kilometer status detected and stored in the control device can also be checked using information stored in the sensor and manipulations at the control device can possibly be uncovered. It has thus also not been possible until now to read other information stored in the sensor such as a serial number.

Documents DE 10 2014 216 295 A1 and WO2015/039895 refer to an expansion of the AK protocol, which teaches a method for generating an item of sensor information which is dependent on a rotation speed using a rotation speed sensor, wherein the rotation speed sensor is configured to output rotation speed pulses in predetermined angular positions of a physical encoder field which rotates at the rotation speed. The method comprises the generation of a digital angle signal which is dependent on the angular position of the physical encoder field and the outputting of a predetermined number of most significant bits of the digital angle signal as sensor information. This teaching is aimed at a change to the AK protocol which enables a higher density of information transfer at low speeds and disadvantageously requires a replacement of all existing evaluation circuits since they cannot be used any more.

SUMMARY OF THE INVENTION

An object of the invention consists in eliminating the disadvantages from the prior art and providing a teaching for transferring additional wheel information which is relevant to utility vehicles.

The object may be achieved in accordance with the teaching according to the wheel information transfer apparatus as described herein, the wheel information transfer method as described herein, and the vehicle as described herein. Advantageous developments are the subject matter of the further descriptions herein.

What is disclosed is: a wheel information transfer apparatus having an information detection apparatus, which is configured to detect or store wheel-related information, and a, which is configured to transfer the wheel-related information over a transfer medium, wherein the information transfer apparatus is configured to transfer at least a first portion of the wheel-related information parallel or quasi-parallel, and wherein the information transfer apparatus is configured to transfer the first portion of the wheel-related information or a second portion of the wheel-related information serially within the parallel or quasi-parallel data transfer.

In this case, in particular the wheel information transfer apparatus is an active rotation speed sensor, which is configured to transfer the first portion of the wheel information by the AK protocol and to transfer the first portion or the second portion of the wheel information serially.

As a result, it is possible to transmit, in addition to the information transferred via the AK protocol, any further desired information which can be detected by a rotation speed sensor.

What is also disclosed is: a wheel information transfer method, which has the following steps: detecting or storing wheel information by an information detection apparatus of a wheel information transfer apparatus, transmitting a first portion of the wheel information by an information transfer apparatus, wherein the transmission takes place parallel or quasi-parallel, transmitting the first portion of the wheel information or a second portion of the wheel information by the information transfer apparatus, wherein the transmission takes place serially within the parallel or quasi-parallel transmission.

What is also disclosed is: a motor vehicle, in particular a utility vehicle or heavy goods vehicle, having a wheel information transfer apparatus as described herein one of the wheel information transfer apparatus as described herein.

The invention is described below using an exemplary embodiment with reference to the figures.

DETAILED DESCRIPTION

Figure 1:
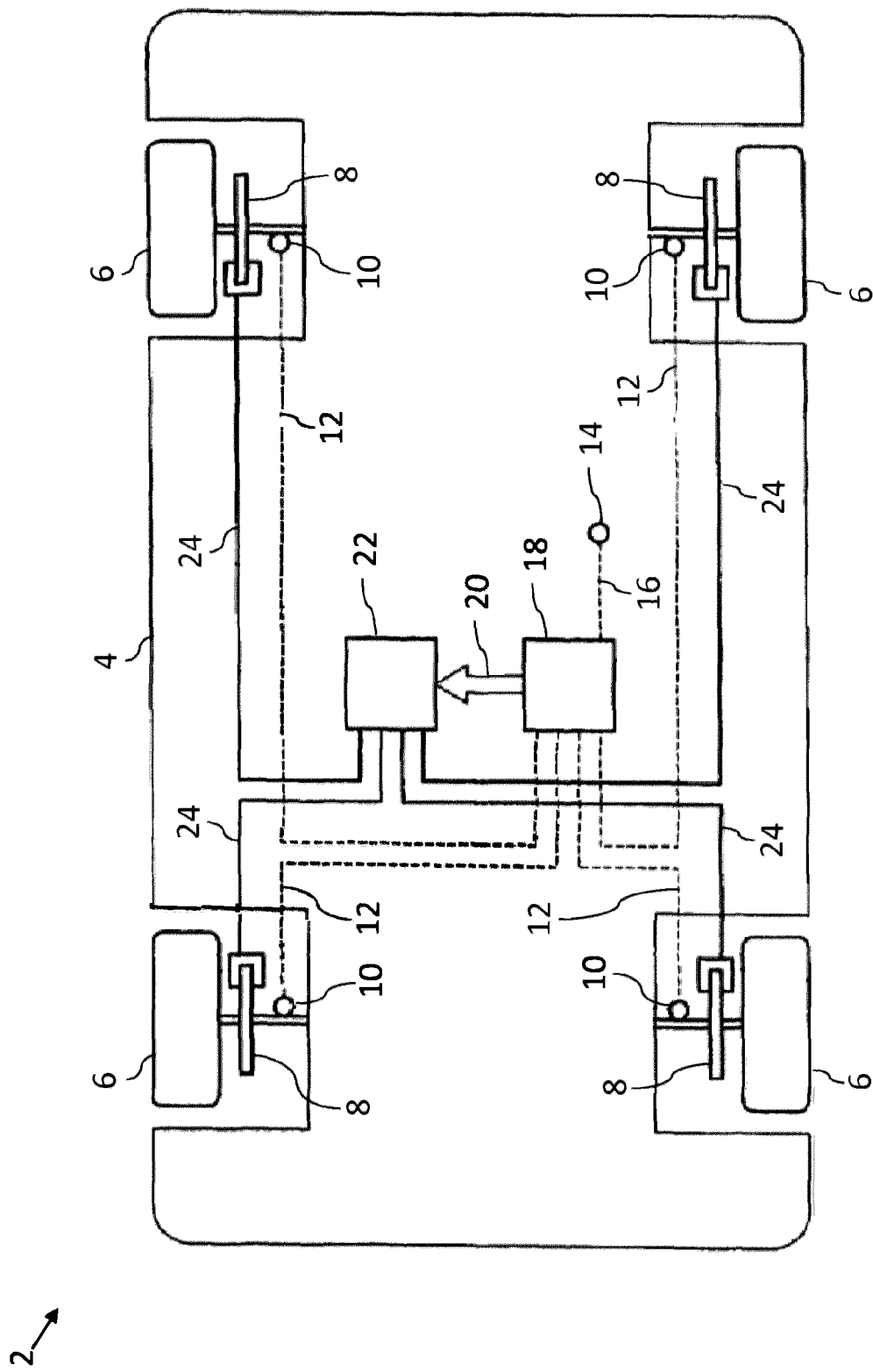
FIG. 1 shows a schematic view of a vehicle having the wheel information transfer apparatus according to the invention.

FIG. 1 shows a schematic view of a vehicle 2, for example a utility vehicle having known electronic stability control.

The vehicle 2 comprises a chassis 4 and, for example, two axles having four wheels 6. Alternatively, the vehicle can have more than two axles and a corresponding higher number of wheels or can be provided with a towed trailer or can consist of a tractor and a semitrailer, wherein the elements each have dedicated axles and wheels. Each wheel 6 can be braked with respect to the chassis 4 via a brake 8 which is fastened in a fixed position on the chassis 4 in order to slow down a movement of the vehicle 2.

In this case, the wheels 6 of the vehicle 2 can, in a known manner, lose their traction, and the vehicle 2 can even be moved away from a trajectory preset, for example, via a steering wheel (not shown in any further detail) by understeering or oversteering. This is avoided by control loops which are known per se, such as an anti-lock braking system and electronic stability control.

In the present embodiment, the vehicle 2 has, for this purpose, wheel information transfer apparatuses 10 on the wheels 6 which detect a rotation speed 12 of the wheels 6. In addition, the vehicle 2 has an inertial sensor 14, which detects vehicle dynamics data 16 of the vehicle 2 which can include, for example, a pitch rate, a roll rate, a yaw rate, a lateral acceleration, a longitudinal acceleration or a vertical acceleration.

On the basis of the detected rotation speeds 12 and vehicle dynamics data 16, an evaluation device in the form of a controller 18 can determine, in a known manner, whether the vehicle 2 is skidding on the roadway or is even deviating from the above-mentioned preset trajectory, and can respond correspondingly to this with a controller output signal 20 known per se. The controller output signal 20 can then be used by an actuating device 22 in order to control, by actuating signals 24, actuating elements, such as the brakes 8, which respond to the skidding and the deviation from the preset trajectory in a manner known per se.

Figure 2:
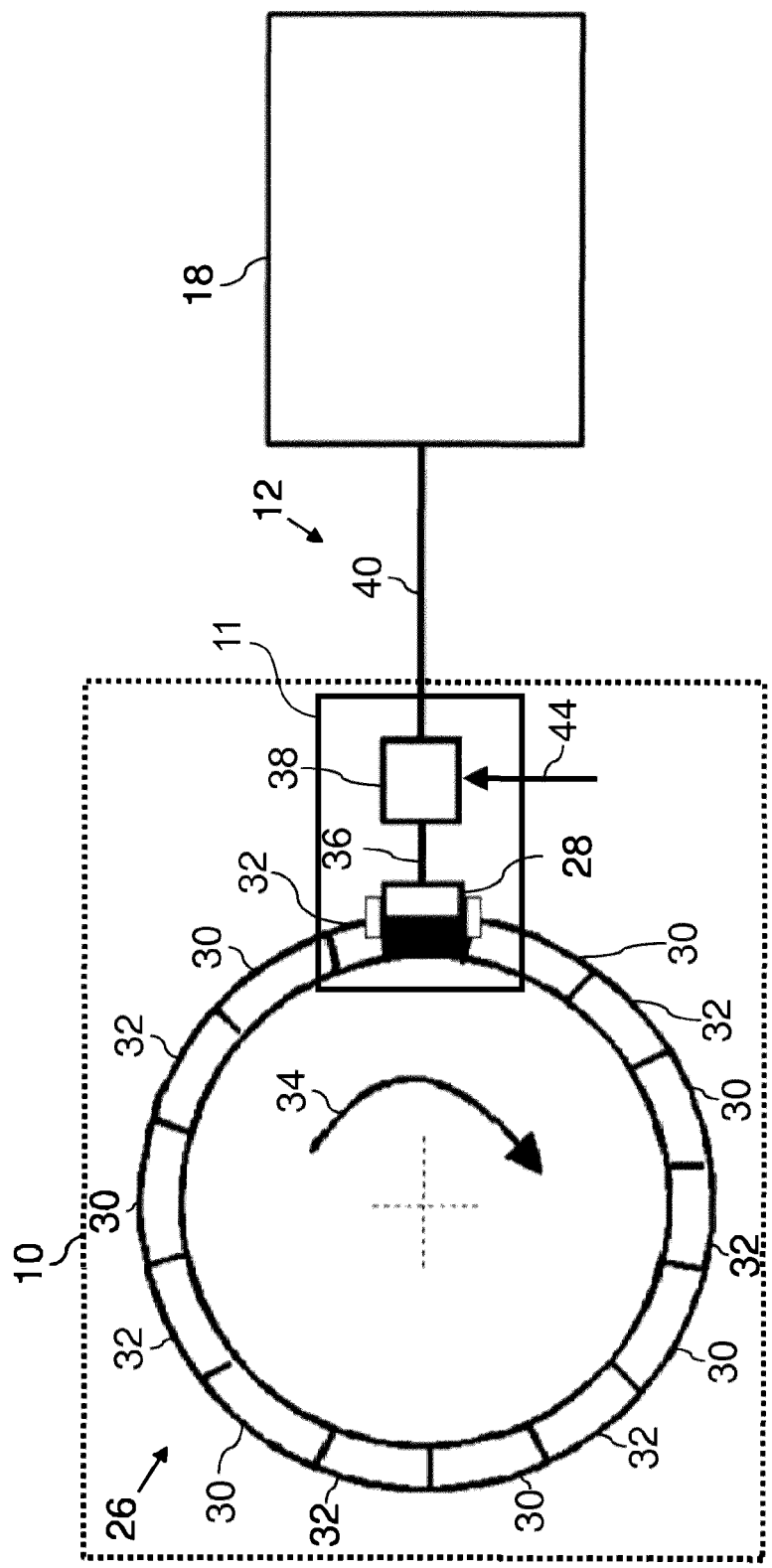
FIG. 2 shows a schematic view of one of the wheel information transfer apparatuses in the electronic stability control from FIG. 1.

FIG. 2 shows a schematic view of one of the wheel information transfer apparatuses 10 in the electronic stability control from FIG. 1.

A wheel information transfer apparatus 10 comprises a rotation speed sensor 1 and, in the present embodiment, is in the form of an active rotation speed sensor, which comprises an encoder disk 26 fastened in a manner fixed against rotation on the wheel 6 and a reader head 28 fastened so as to be fixed in position on the chassis 4. As the description proceeds, reference will be made to a magnetic encoder disk 26. However, ferromagnetic encoders or magnet wheels, such as have been used until now in passive rotation speed sensors, can also be used. The relevant technical difference consists in that, in said case, the required magnetic field is generated by a magnet which is fixedly installed behind the reader head 28.

The encoder disk 26 in the present embodiment consists of magnet north poles 30 and magnet south poles 32 arranged next to one another in a row which together excite an encoder magnetic field (not illustrated in any further detail). If the encoder disk 26 fastened to the wheel 6 rotates along with the wheel in a direction of rotation 34, the encoder magnetic field thus also rotates. The reader head 28 in the present embodiment is a magnetostrictive element, which changes its electrical resistance depending on the angular position of the encoder magnetic field excited by the encoder wheel 26.

Figure 3:
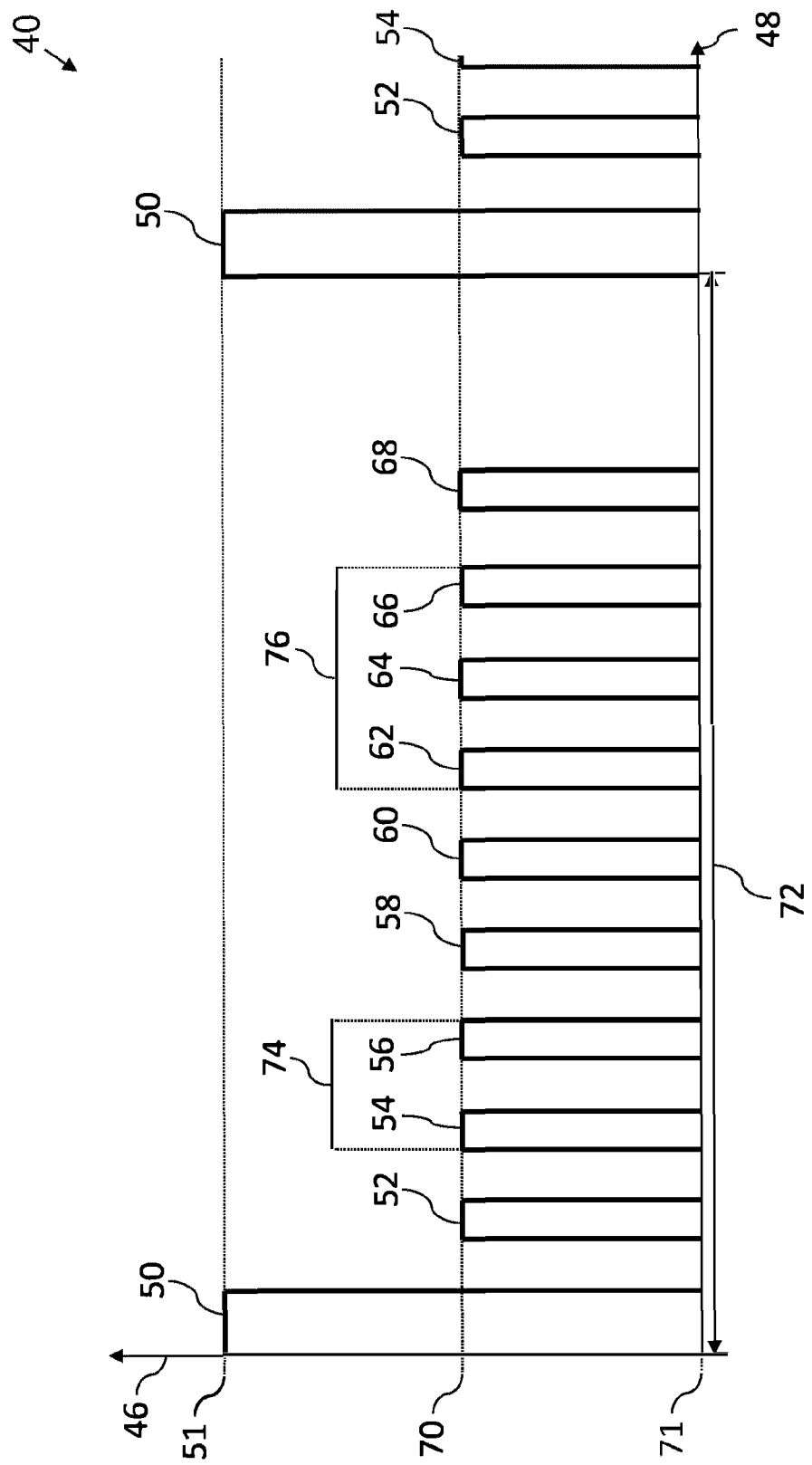
FIG. 3 shows a pulse signal of the wheel information transfer apparatus from FIG. 1.

In order to detect the rotation speed 12, the change in the angular position of the encoder wheel 26 and therefore the change in the electrical resistance of the reader head 28 is detected. The change in resistance generates a signal with rising and falling edges correlating to the number of magnet north poles 30 and magnet south poles 32. For this purpose, the reader head 28 can, in a known manner, be connected to a resistance measurement circuit (not illustrated in any further detail), such as, for example, a known bridge circuit. Depending on the electrical resistance of the reader head 28, a periodic output signal, referred to below as rotation speed encoder signal 36, is generated in the resistance measurement circuit. On the basis of the rotation speed encoder signal 36, in a known manner a schematic pulse signal 40, which is dependent on the rotation speed 12 and is shown in FIG. 3, can be generated in a signal-conditioning circuit 38 connected downstream of the reader head 28 and can be output to the controller 18. The wheel information apparatus 10 additionally contains an electronic data-processing device 44, which can detect further information, such as a component part temperature, and can store and transmit information such as the temperature, a serial number or a key and further information. The data-processing device 44 in the exemplary embodiment is optionally provided in the rotation speed sensor 11.

FIG. 3 shows the pulse signal 40 in the form of current values over time 48.

The pulse signal 40 carries the information on the rotation speed 12 in the form of speed pulses 50 with a first pulse level 51, which will be referred to below as high pulse level 51. These speed pulses 50 are transferred with the highest priority, which means that, in the case of a relatively short period 72, the transfer of a speed pulse 50 the transfer of all other information is deferred or interrupted.

In addition to the speed pulses 50, at least one further information pulse 52 to 68 is entered into the pulse signal 40, which at least one further information pulse can have, depending on the information to be transferred, for example, a second pulse level 70, which will be referred to below as medium pulse level 70, or a third pulse level 71, which will be referred to below as low pulse level 71. For reasons of clarity, all of the information pulses 52 to 68 are illustrated with the medium pulse level 70 in FIG. 3. Whether a pulse assumes the logic value 0 or 1 is converted using Manchester coding. In this case, an edge rising towards the pulse center to the medium pulse level 70 is evaluated as logic 1, and an edge falling towards the pulse center to the low pulse level 71 is evaluated as logic 0. In the present embodiment, nine information pulses 52 to 68 are entered into the pulse signal 40 after the speed pulse 50, on the basis of the AK protocol known per se of the work group of the automotive industry. Each information pulse 52 to 68 in this case carries a bit #0 to #8. The AK protocol has conventionally been used already for monitoring an air gap (not visible in FIG. 2) between the encoder wheel 26 and the reader head 28, wherein the individual information pulses 52 to 68 have been assigned below in the following manner: From the specification for the AK protocol 4.0, two groups result with freely useable bits. Group 1 with the reference symbol 74 with two bits #1 and #2 with the reference symbols 54-56 and group 2 with the reference symbol 76 with three bits #5-#7 with the reference symbols 62-66. The table below shows already additionally assigned bits #1, #5-#7, which are often thus assigned in the automotive industry.

| Bit No. | Abbreviation | Designation | Coding |
| --- | --- | --- | --- |
| #0 | LR | air gap reserve | 0 = ok; 1 = fault |
| #1 | SLM | signal amplitude validity | |
| #2 | free | | |
| #3 | GDR | direction of rotation validity | 0 = invalid; 1 = valid |
| #4 | DR | direction of rotation | 0 = positive; 1 = negative |
| #5 | LM0 | air gap reserve (LSB) | lowest significant bit |
| #6 | LM1 | air gap reserve | |
| #7 | LM2 | air gap reserve (MSB) | most significant bit |
| #8 | P | parity even | calculated |

In the vehicle, the wheel rotation speeds 12 of all of the wheel rotation speed sensors 11 of the vehicle 2 converge in a control device, which will be assumed below to be, by way of example, the controller 18, in the signal chain of a wheel rotation speed sensor system, and can be conditioned and made available, in addition to the control device 18, for a large number of further vehicle systems.

This listed information in the form of nine bits is transferred quasi-parallel as a data packet after the speed pulse 50 by varying the internal resistance and modulation, brought about hereby, of the current in the case of each tooth flank of the encoder wheel 26. In this case, parallel transfer means that each bit of the data packet is assigned to a specific item of information, and all of the bits are transferred at the same time. Quasi-parallel transfer means that each bit of the data packet is assigned to a specific item of information, and all of the bits are transferred simultaneously on data packet level even if the transfer of the data packet takes place sequentially. This applies in particular when, as in the case of the AK protocol, the bits #0 to #8 are considered as dedicated data channels, which are transferred in a synchronous time-multiplexing method. Parallel and quasi-parallel transfer have in common that each bit is in principle fixedly linked to an item of information.

In the case of an encoder wheel 26 having 100 magnet north poles 30 and 100 magnet south poles 32 which is generally installed in the utility vehicle, 200 data packets can therefore be transferred with each wheel revolution with each rising or falling signal edge.

In the AK protocol, bit #2 in the data packet is unused. The transferrable information is limited as only one bit in the quasi-parallel data packet. In the exemplary embodiment, therefore, this bit #2 is used as the serial data transfer channel. Sequential data transfer means that a bit is not assigned to a fixed significance and the transferred information comprises the respective bits #2 of a plurality of consecutively transferred data packets. In the exemplary embodiment, the AK protocol otherwise remains untouched. In the case of utility vehicles, the frequency range to be expected with which the serial protocol is transferred is between 3 and 900 Hz. The rotation speed sensor 11 generally also has standstill identification and produces a standstill signal in each case after 150 ms below a relatively low speed. This corresponds to a frequency of approximately 3.3 Hz. The communication speed is variable depending on the rotation speed of the wheel. A range of 0 Hz to 2000 Hz is possible from a sensor point of view. The more quickly the wheel rotates, the more quickly the next speed pulse comes. The data packet of the AK protocol is correspondingly chopped when the next speed pulse takes place prior to the end of the transmission of the data packet. The last bit #8, the parity bit, is correspondingly chopped even earlier—at approximately 900 Hz (approximately 100 km/h). Until there is a shortening of all the bits up to bit #2, approximately 2000 Hz (>200 km/h) is required. Therefore, during normal operation of a heavy goods vehicle (and most passenger vehicles) all of the bits are available. All of the transferred bits can be checked for errors via the parity bit. Therefore, the serial communication according to the invention also ensures that the transferred information is valid. The serial communication is plausibility-checked by the parity bit. If the speed is low, the serial data stream is also slower. In order to counteract this, in this case an information transfer can be used with a variable speed. At a slow speed or at a standstill, only the transfer of the temperature is sensible in the inventors' view. Depending on the speed, therefore, more or fewer information blocks can be transferred.

Conventionally, the rotation speed sensor 11 stores a serial number consisting of 80 bits and detects a component part temperature of −40° C. to +210 in a value with 8 bits.

In the exemplary embodiment, a serial data transfer protocol transferred via the bit #2 is implemented in such a way that a transfer sequence with an initialization bit sequence takes place. In the exemplary embodiment, the initialization bit sequence consists of a value 7 bits long, which always has the form "010101" (2A HEX).

Thereupon follows a type value 7 bits long, by which the information to be transferred is specified. Thus, for example, the value "1010100" indicates the subsequent transfer of the temperature, and the value "01010011" indicates the subsequent transfer of the serial number.

Thereupon follows a length value 7 bits long, which indicates the length in bits of the information to be transferred. In the case of the transfer of the temperature, an 8-bit long value needs to be transferred, i.e. the value "0001000" needs to be indicated. In the case of the transfer of the serial number, an 80-bit long value needs to be transferred, i.e. in this case the value "1010000".

Thereupon, the transfer of the actual information in the indicated length takes place in a data value.

With this protocol, payloads with a length of 0 up to 128 bits are possible. Including the header information with a length of 21 bits, a transfer sequence has a length of from 21 to 149 bits and is transferred in the case of a rotation speed sensor 10 with 200 signal edges within a wheel revolution. At a minimum, i.e. when the wheel is at a standstill, the transfer rate is 6.6 its/s. The transfer duration of a transfer sequence is therefore 3.15 s to 22.35 s. In an advantageous development of the exemplary embodiment, at low rotation speeds only short transfer sequences such as, for example, those with respect to the temperature are transmitted (<4.35 s).

In the exemplary embodiment, the following transfer information is defined:

| Type of information | Bit sequence | Length (bits) |
|---|---|---|
| Serial number | 1010011 (S) | 80 |
| Temperature | 1010100 (T) | 8 |
| Customer storage area | 1001011 (K) | 112 |
| Key | 1010000 (P) | 128 |
| Magnetic field strength | 1001101 (M) | 8 |
| Sensor type | 1001110 (N) | 24 |
| Debug information | 1000100 (D) | 128 |

In an advantageous development of the exemplary embodiment, the data transfer of type value, length value and data value is encoded. For this purpose, a public/private key system can be used, in which the public key of the rotation speed sensor is known to the controller 18 or in which the rotation speed sensor communicates the public key used by a transfer sequence.

The serial data transfer can be concluded by a check value, for example a CRC value, which enables a plausibility check to be performed in respect of the serial data transfer.

As protection, a number can be added to the messages. The recipient only recognizes messages with the currently highest serial number. According to the invention, the serial number can be, for example, an operating time of the sensor or else a distance covered. Thus, there is an improvement in respect of the encoding of the communication and information about operating time or distance. This information can also be used in the case of complaints and in the case of a plausibility check in respect of a tachograph.

In an advantageous development of the exemplary embodiment, in the AK protocol it is not only the bit #2 that is used as serial transfer channel, but, for example, the bits #1 or #5-#7 as well. These bits are freely assignable in accordance with AK protocol Version 4.0.

The controller 18 is adapted in terms of software in such a way that it can detect and evaluate the serially transferred information. The sensor according to the invention can also be used, however, with a conventional controller 18, wherein, in this case, the serially transferred information is ignored, and the system otherwise remains functional.

The exemplary embodiment is merely provided as an exemplary configuration of the invention as provided herein and does not restrict the invention as provided herein. A person skilled in the art will be able to recognize that configurations which can deviate from the exemplary embodiment are possible within the scope of the disclosure herein.

In the description, the terms "and", "or" and "either . . . or" are used as logical connective within the meaning of the logical conjunction (mathematical AND), as logical connective within the meaning of the logical disjunction (mathematical OR, often also "and/or") and as logical connective within the meaning of the logical exclusive disjunction (mathematical exclusive OR).

Method steps specified in the description or the further disclosures serve merely as a list of the required method steps. They only imply an order where the order is explicitly specified or as appears necessary for a person skilled in the art. In particular, the list does not imply any conclusive enumeration.

THE LIST OF REFERENCE SYMBOLS IS AS FOLLOWS 2 utility vehicle
4 chassis
6 wheel
8 brake
10 wheel information transfer apparatus
11 rotation speed sensor
12 rotation speed
14 inertial sensor
16 vehicle dynamics data
18 controller
20 controller output signal
22 actuating device
24 actuating signal
26 encoder disk
28 reader head
30 magnet north pole
32 magnet south pole
34 direction of rotation
36 rotation speed encoder signal
38 signal-conditioning circuit
40 pulse signal
44 data-processing device
46 current value
48 time
50 speed pulse
51 high pulse level
52-68 information pulses
70 medium pulse level
71 low pulse level
72 period
74 group 1
76 group 2

The invention claimed is:

1. A wheel information transfer apparatus, comprising:
an information detection apparatus to detect and store wheel-related information; and
an information transfer apparatus to transfer the wheel-related information over a transfer medium;
wherein the information transfer apparatus is configured to parallel transfer or quasi-parallel transfer at least a first portion of the wheel-related information,
wherein the information transfer apparatus is configured to transfer the at least first portion of the wheel-related information or a second portion of the wheel-related information serially within the parallel transfer or the quasi-parallel transfer,
wherein for the parallel transfer, each bit of the data packet is assigned to a specific item of information, and all of the bits are transferred at a same time, and
wherein for the quasi-parallel transfer, each bit of the data packet is assigned to the specific item of information, and all of the bits are transferred simultaneously on a data packet level even if the transfer of the data packet takes place sequentially.

2. The wheel information transfer apparatus of claim 1, wherein the wheel information transfer apparatus is an active rotation speed sensor, which is configured to transfer the first portion of the wheel information by the AK protocol and to transfer the first portion or the second portion of the wheel information serially.

3. The wheel information transfer apparatus of claim 1, wherein the first portion of the wheel information is an air gap reserve, a signal amplitude validity, a direction of rotation validity, a direction of rotation or parity information, and the second portion of the wheel information is a sensor serial number, a component part temperature, a cipher key, customer information or sensor information.

4. The wheel information transfer apparatus of claim 1, wherein the information transfer apparatus is configured to transfer the first portion of the wheel information or the second portion of the wheel information over one or more serial transfer channels.

5. The wheel information transfer apparatus of claim 1, wherein the information transfer apparatus is configured to perform the serial data transfer in such a form that a transfer sequence consists of an initial bit sequence, which indicates a data transfer start, a type value, which indicates the data type to be transferred, and a length value, which indicates a length of the data payload to be transferred.

6. The wheel information transfer apparatus of claim 1, wherein the information transfer apparatus is configured to perform the serial data transfer in such a form that a transfer sequence additionally has a data payload of the length specified in the length value or a check information item, in particular a CRC value.

7. The wheel information transfer apparatus of claim 1, wherein the information transfer apparatus is configured to transfer the first portion of the wheel information or the second portion of the wheel information serially and in encoded form.

8. A method for providing transfer of wheel information, the method comprising:
detecting or storing wheel information by an information detection apparatus of a wheel information transfer apparatus;

parallel transmitting or quasi-parallel transmitting a first portion of the wheel information by an information transfer apparatus; and parallel transmitting or quasi-parallel transmitting the first portion of the wheel information or a second portion of the wheel information by the information transfer apparatus, wherein the transmitting takes place serially within the parallel transmitting or the quasi-parallel transmitting, wherein for the parallel transmitting, each bit of the data packet is assigned to a specific item of information, and all of the bits are transferred at a same time, and wherein for the quasi-parallel transmitting, each bit of the data packet is assigned to the specific item of information, and all of the bits are transferred simultaneously on a data packet level even if the transfer of the data packet takes place sequentially.

9. The method of claim 8, wherein the wheel information transfer apparatus includes an active rotation speed sensor, and wherein transmission of the first portion of the wheel information takes place by the AK protocol.

10. The method of claim 8, wherein the first part of the wheel information is an air gap reserve, a signal amplitude validity, a direction of rotation validity, a direction of rotation or parity information, and the second portion of the wheel information is a sensor serial number, a component part temperature, a cipher key, customer information or sensor information.

11. The method of claim 8, wherein transmission of the first portion of the wheel information or the second portion of the wheel information takes place over one or more serial transfer channels.

12. The method of claim 8, wherein transmission of the first portion of the wheel information or a second portion of the wheel information by serial data transfer includes the following:

transmitting an initial bit sequence, which indicates a data transfer start, transmitting a type value, which indicates the data type to be transferred, and transmitting a length value, which indicates a length of the data payload to be transferred.

13. The method of claim 8, wherein transmission of the first portion of the wheel information or a second portion of the wheel information by serial data transfer includes:

transmitting a data payload of the length specified in the length value, and/or transmitting a check information item, in particular a CRC value.

14. The method of claim 8, wherein transmission of the first portion of the wheel information or a second portion of the wheel information by serial data transfer takes place in encoded form.

15. A vehicle, including a motor vehicle or a utility vehicle, comprising:

a wheel information transfer apparatus, including:

an information detection apparatus to detect and store wheel-related information; and an information transfer apparatus to transfer the wheel-related information over a transfer medium;

wherein the information transfer apparatus is configured to parallel transfer or quasi-parallel transfer at least a first portion of the wheel-related information, wherein the information transfer apparatus is configured to parallel transfer or quasi-parallel transfer the at least first portion of the wheel-related information or a second portion of the wheel-related information serially within the parallel transfer or the quasi-parallel transfer, wherein for the parallel transfer, each bit of the data packet is assigned to a specific item of information, and all of the bits are transferred at a same time, and wherein for the quasi-parallel transfer, each bit of the data packet is assigned to the specific item of information, and all of the bits are transferred simultaneously on a data packet level even if the transfer of the data packet takes place sequentially.

* * * * *